(12) United States Patent
Sakai et al.

(10) Patent No.: US 11,156,532 B2
(45) Date of Patent: Oct. 26, 2021

(54) STATUS MONITORING APPARATUS, STATUS MONITORING METHOD, AND PROGRAM

(71) Applicant: SHINWA CONTROLS CO., LTD, Kawasaki (JP)

(72) Inventors: Seiichiro Sakai, Kawasaki (JP); Yasuhiro Naohara, Kawasaki (JP)

(73) Assignee: Shinwa Controls Co., Ltd, Kawasaki (JP)

(*) Notice: Subject to any disclaimer, the term of this patent is extended or adjusted under 35 U.S.C. 154(b) by 357 days.

(21) Appl. No.: 16/328,528

(22) PCT Filed: May 28, 2018

(86) PCT No.: PCT/JP2018/020409
§ 371 (c)(1),
(2) Date: Feb. 26, 2019

(87) PCT Pub. No.: WO2018/221469
PCT Pub. Date: Dec. 6, 2018

(65) Prior Publication Data
US 2019/0195741 A1 Jun. 27, 2019

(30) Foreign Application Priority Data

May 31, 2017 (JP) .............. JP2017-108040

(51) Int. Cl.
*G01M 99/00* (2011.01)
*F24F 11/52* (2018.01)
(Continued)

(52) U.S. Cl.
CPC .......... *G01M 99/005* (2013.01); *F24F 11/30* (2018.01); *F24F 11/38* (2018.01); *F24F 11/52* (2018.01);
(Continued)

(58) Field of Classification Search
CPC ....... G01M 99/00; G01M 99/05; G06T 11/20; G06T 11/206; G06K 9/62; G06K 9/6256;
(Continued)

(56) References Cited

U.S. PATENT DOCUMENTS

| 2012/0078670 A1 | 3/2012 | Yamamura et al. |
| 2014/0266755 A1 | 9/2014 | Arensmeier et al. |

(Continued)

FOREIGN PATENT DOCUMENTS

| CN | 105074344 A | 11/2015 |
| CN | 106600581 | * 4/2017 ........... G01N 21/892 |

(Continued)

OTHER PUBLICATIONS

Yildiz Karaday, A Hybrid Deep Learning Framework for Unsupervised Anomaly Detection in Multivariate Spatio-Temporal Data, 2020, 25 pages (Year: 2020).*

(Continued)

*Primary Examiner* — Tung S Lau
(74) *Attorney, Agent, or Firm* — Burr & Brown, PLLC

(57) ABSTRACT

A status monitoring apparatus includes information obtaining means to obtain detected information items that are continuously detected; image data generating means to partition the detected information items by frames at predetermined time intervals, and configured to generate, for each frame, two-dimensional image data representing a distribution of detected information items in the frame, with an axis of abscissa being a time axis and an axis of ordinate being an axis showing a value/amount of the detected information items; and status detecting means to perform a machine learning based on the two-dimensional image data generated by the image data generating means to generate a correct label for judging whether the two-dimensional image data show at least a warning sign of failure, and to judge that (Continued)

at least a warning sign of failure has occurred in the detected information items, when the two-dimensional image data corresponding to the correct label are generated.

7 Claims, 6 Drawing Sheets

(51) Int. Cl.
*F24F 11/38* (2018.01)
*F24F 11/30* (2018.01)
*G05B 23/02* (2006.01)
*F24F 11/63* (2018.01)
*G06N 20/00* (2019.01)
*G06K 9/62* (2006.01)
*G06T 11/20* (2006.01)

(52) U.S. Cl.
CPC .............. *F24F 11/63* (2018.01); *G05B 23/02* (2013.01); *G06K 9/6256* (2013.01); *G06N 20/00* (2019.01); *G06T 11/206* (2013.01)

(58) Field of Classification Search
CPC ....... G06K 9/0053; G06N 20/00; F24F 11/52; F24F 11/38; F24F 11/30; F24F 11/63; G05B 23/02; G05B 23/024
See application file for complete search history.

(56) References Cited

U.S. PATENT DOCUMENTS

| | | | |
|---|---|---|---|
| 2017/0076209 A1 | 3/2017 | Sisk et al. | |
| 2018/0059656 A1 | 3/2018 | Hiruta et al. | |
| 2018/0095454 A1 | 4/2018 | Zhao et al. | |
| 2020/0349699 A1* | 11/2020 | Shah | G06F 16/51 |

FOREIGN PATENT DOCUMENTS

| | | | | | |
|---|---|---|---|---|---|
| CN | 106776005 | * | 5/2017 | .......... | G06F 11/3006 |
| CN | 106874926 | * | 6/2017 | .......... | H04L 43/045 |
| CN | 103763515 | * | 8/2017 | .............. | H04N 7/18 |
| CN | 107833083 | * | 3/2018 | ....... | H04L 29/08072 |
| CN | 110727178 | * | 1/2020 | .......... | G03F 7/70591 |
| JP | 2010-230595 A1 | | 10/2010 | | |
| JP | 2010-250384 A1 | | 11/2010 | | |
| JP | 2012-159270 A1 | | 8/2012 | | |
| JP | 6105141 B1 | | 3/2017 | | |
| JP | 6298562 | * | 3/2018 | .............. | F24F 11/30 |
| JP | 201820494 | * | 12/2018 | .............. | F24F 11/88 |
| JP | 2020-71716 A | * | 5/2020 | .............. | G06T 7/00 |
| WO | 2016/143118 A1 | | 9/2016 | | |
| WO | WO 2019/188040 A1 | * | 10/2019 | .............. | G06N 20/00 |
| WO | WO 2020108806 | * | 6/2020 | .............. | A61B 90/00 |

OTHER PUBLICATIONS

Deep Learning for Anomaly Detection, 2020, 95 pages (Year: 2020).*
Sequential pattern profiling based bio-detection for smart health Service, Cluster Comput (2015) 18:209-219, 209 pages (Year: 2015).*
Abacus.AI, Real-Time Anomaly Detection—A Deep Learning Approach, 2020, 14 pages (Year: 2020).*
LSTM Autoencoder for AnomalyDetection, Brent Larzalere, Sep. 25, 2019, 19 pages (Year: 2019).*
English translation of International Preliminary Report on Patentability (Chapter I) (Application No. PCT/JP2018/020409) dated Dec. 12, 2019, 6 pages.
Extended European Search Report (Application No. 18809162.3) dated Jan. 29, 2021.
International Search Report and Written Opinion (Application No. PCT/JP2018/020409) dated Aug. 21, 2018.

* cited by examiner

DATA IN ONE FRAME

| | A<br>INV CURRENT VALUES<br>OF BLOWER [A] | B<br>CURRENT VALUES<br>AFTER SUBTRACTION |
|---|---|---|
| 1 | 27.14 | 1.14 |
| 2 | 27.00 | 1.00 |
| 3 | 26.85 | 0.85 |
| 4 | 27.02 | 1.02 |
| 5 | 26.90 | 0.90 |
| 6 | 27.43 | 1.43 |
| 7 | 27.07 | 1.07 |
| 8 | 27.48 | 1.48 |
| 9 | 27.13 | 1.13 |
| 10 | 27.27 | 1.27 |
| 11 | 27.45 | 1.45 |
| 12 | 27.44 | 1.44 |
| 13 | 27.31 | 1.31 |
| 14 | 27.26 | 1.26 |
| 15 | 27.29 | 1.29 |
| 16 | 27.07 | 1.07 |
| 17 | 27.05 | 1.05 |
| 18 | 27.01 | 1.01 |
| 19 | 27.06 | 1.06 |
| 20 | 27.16 | 1.16 |
| 21 | 27.12 | 1.12 |
| 22 | 26.94 | 0.94 |
| 23 | 27.23 | 1.23 |
| 24 | 27.16 | 1.16 |
| 25 | 27.04 | 1.04 |

STATUS MONITORING APPARATUS, STATUS MONITORING METHOD, AND PROGRAM

FIELD OF THE INVENTION

The present invention relates to a status monitoring apparatus, a status monitoring method, and a program, which are suitably used for monitoring a status of an air conditioner or a chiller operated for a long period of time, for example.

BACKGROUND ART

Examples of an apparatus that is operated for a long period of time are an air conditioner and a chiller installed on semiconductor manufacturing facilities. An air conditioner generally comprises a refrigeration circuit including a compressor, a condenser, an expansion valve and an evaporator, and a blower that causes air cooled by the evaporator of the refrigeration circuit to flow. In the air conditioner of this type, a compressor and a blower that are driven by a motor are often used, and the motor is supplied with a current by an inverter so as to be driven in rotation. A chiller comprises a pump for causing a liquid to flow. In many cases, such a pump is driven by a motor. Similarly, the motor is supplied with a current by an inverter so as to be driven in rotation.

In a case where an air conditioner and/or a chiller is used in semiconductor manufacturing facilities, when a constituent component thereof suddenly has a failure (malfunction/abnormality), in particular, when a blower of the air conditioner is failed, a manufacturing condition in the semiconductor manufacturing facilities may abruptly change. In this case, there is a possibility that products being manufactured are adversely affected by the change, and a throughput may significantly be lowered. Thus, the air conditioner and the chiller preferably have a failure detecting function. For example, when a current to be supplied becomes larger than a rated current for some reason or other, an inverter has a function for notifying a failure and for stopping the electricity supply if needed. By utilizing this function, a failure detecting function can be easily given to an air conditioner and a chiller. Various techniques related to the failure detection have been conventionally proposed (for example, JP2012-159270A).

SUMMARY OF THE INVENTION

Recently, application of artificial intelligence (AI) is anticipated in various fields. In order to avoid harm caused by the failure of the aforementioned air conditioner and the chiller, the Applicant has made a study on the use of artificial by detecting a warning sign of the failure. Due to the use of an artificial intelligence, it is considered that, the more information items during the operation of the air conditioner and the chiller are accumulated, the more accurately a warning sign of failure can be detected.

However, in order to detect a warning sign of failure with sufficient accuracy, it is necessary to input a large quantity of information items to an artificial intelligence to learn them. In particular, when currents to be supplied to a compressor and a blower are collected, waveforms of the detected currents contain a lot of noise components. In addition, it may be difficult for an artificial intelligence to process such information items. Thus, a lot of time and information items may be required for ensuring a detection accuracy. When tremendous information processing is needed, a large-scale information processing device is needed, which may excessively increase manufacturing costs and inhibit an actual use.

The present invention has been made in view of the above circumstances. The object of the present invention is to provide a status monitoring apparatus, a status monitoring method, and a program that can judge efficiently and accurately a failure or a warning sign of failure of continuously detected information items.

A status monitoring apparatus according to the present invention comprises: an information obtaining means configured to obtain detected information items that are continuously detected; an image data generating means configured to partition the detected information items, which are obtained by the information obtaining means, by frames at predetermined time intervals, and configured to generate, for each frame, two-dimensional image data representing a distribution of the detected information items in the frame, with an axis of abscissa being a time axis and an axis of ordinate being an axis showing a value or an amount of the detected information items; and a status detecting means configured to perform a machine learning based on the two-dimensional image data which are sequentially generated by the image data generating means, so as to generate a correct label for judging whether the two-dimensional image data show a failure or a warning sign of failure, and configured to judge that a failure or a warning sign of failure has occurred in the detected information items, when the two-dimensional image data corresponding to the correct label are generated.

In the status monitoring apparatus according to the present invention, the image data generating means may generate, as the two-dimensional image data, image data representing a polygonal line graph sequentially connecting, by line segments, the detected information items adjacent to each other in the frame.

In addition, in the status monitoring apparatus according to the present invention, the image data generating means may partition the detected information items by two frames continuously adjacent to each other, may sequentially (successively) shift a first frame of the two frames at detection intervals of the detected information items until the first frame is positioned to overlap with a next frame, extracts maximum values and minimum values of the detected information items at a position before the frame is shifted and at respective positions after the frame is shifted, may chronologically arrange the extracted maximum values and the minimum values in an ascending order of the detection timings in the first frame, so as to generate image data showing areas like strips such that an area between a boundary line connecting the maximum values along a polygonal curve and a boundary line connecting the minimum values along a polygonal curve differs from other areas, and may provide the image data as the two-dimensional image data corresponding to the first frame.

In addition, in the status monitoring apparatus according to the present invention, the image data generating means may partition the detected information items by two frames continuously adjacent to each other, may extract, in the respective frames, maximum values and minimum values of the detected information items, may set the maximum value and the minimum value of the detected information items in a first frame of the two frames, at a front end of the axis of abscissa of the first frame, may set the maximum value and the minimum value of the detected information items in a next frame, at a rear end of the axis of abscissa of the first frame, may generate image data showing areas like strips such that an area between a boundary line connecting the maximum values by a line segment and a boundary line connecting the minimum values by a line segment differs from other areas, and may provide the image data as the two-dimensional image data corresponding to the first frame.

In addition, in the status monitoring apparatus according to the present invention, when an integer part of a minimum value of the detected information items, which is expressed as a numerical value, is larger than 1, the image data generating means may subtract, from the respective detected information items, a predetermined numerical value, in such a manner that the integer part of the minimum value becomes 0, and may generate the two-dimensional image data based on the respective information items after the subtraction.

In addition, in the status monitoring apparatus according to the present invention, the detected information items may be current values of a current supplied to a compressor of a refrigeration circuit constituting an air conditioner, pressure values of a refrigerant circulating in the refrigeration circuit, acceleration values of an expansion valve of the refrigeration circuit, current values of a current supplied to a blower constituting the air conditioner, or current values of a current supplied to a pump for conveying a liquid.

In addition, in the status monitoring apparatus according to the present invention, the image data generating means may connect aggregations of the detected information items along a polygonal curve to carry out a frequency analysis, and may use a period of frequency components evaluated as peaks as a width of the axis of abscissa of the frame.

In addition, a status monitoring method according to the present invention comprises: an information obtaining step which obtains detected information items that are continuously detected; an image data generating step which partitions the detected information items, which are obtained in the information obtaining step, by frames at predetermined time intervals, and generates, for each frame, two-dimensional image data representing a distribution of the detected information items in the frame, with an axis of abscissa being a time axis and an axis of ordinate being an axis showing a value or an amount of the detected information items; and a status detecting step which performs a machine learning based on the two-dimensional image data which are sequentially generated in the image data generating step, so as to generate a correct label for judging whether the two-dimensional image data show a failure or a warning sign of failure, and judges that a failure or a warning sign of failure has occurred in the detected information items, when the two-dimensional image data corresponding to the correct label are generated.

In addition, a program according to the present invention is a program executable in a computer to perform: an information obtaining step which obtains detected information items that are continuously detected; an image data generating step which partitions the detected information items, which are obtained in the information obtaining step, by frames at predetermined time intervals, and generates, for each frame, two-dimensional image data representing a distribution of the detected information items in the frame, with an axis of abscissa being a time axis and an axis of ordinate being an axis showing a value or an amount of the detected information items; and a status detecting step which performs a machine learning based on the two-dimensional image data which are sequentially generated in the image data generating step, so as to generate a correct label for judging whether the two-dimensional image data show a failure or a warning sign of failure, and judges that a failure or a warning sign of failure has occurred in the detected information items, when the two-dimensional image data corresponding to the correct label are generated.

According to the present invention, a failure or a warning sign of failure of continuously detected information items can be judged efficiently and accurately.

DETAILED DESCRIPTION OF THE INVENTION

An embodiment of the present invention will be described herebelow.

Figure 1:
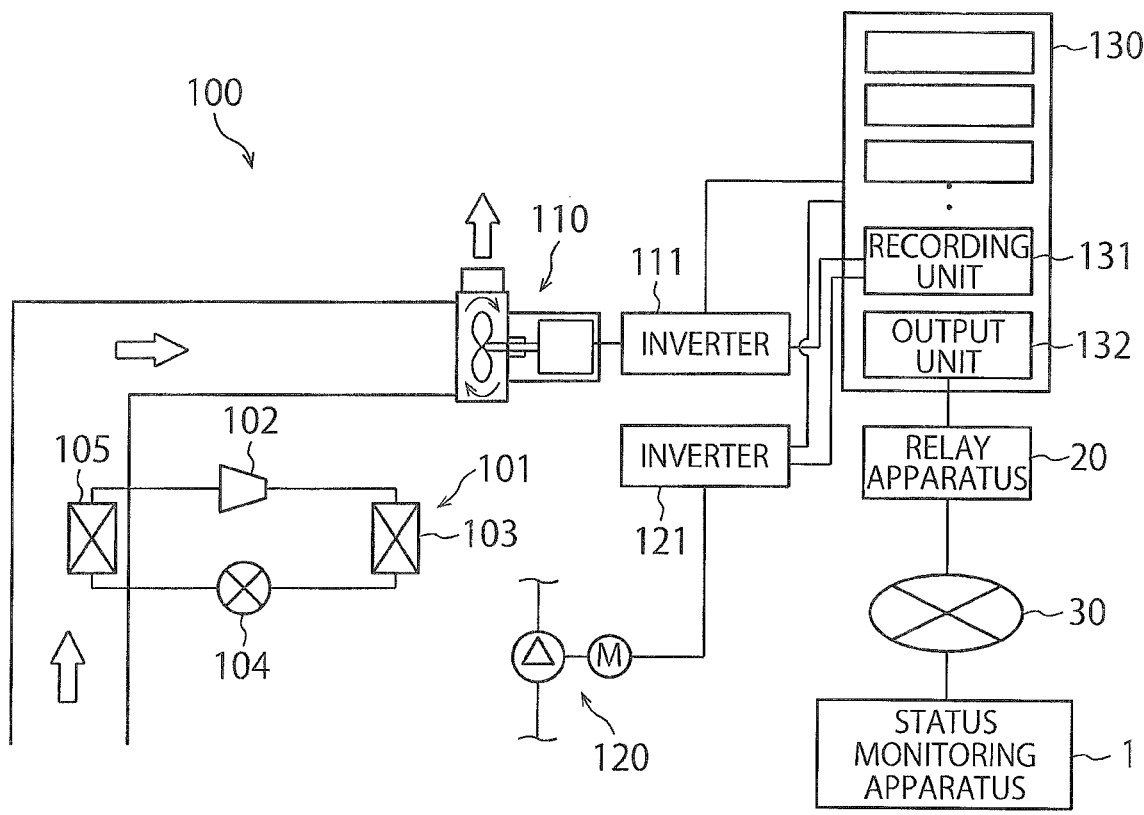
FIG. 1 is a diagram showing a status monitoring apparatus according to one embodiment of the present invention, and a temperature controlling apparatus that is monitored by the status monitoring apparatus.

FIG. 1 shows a status monitoring apparatus 1 according to one embodiment of the present invention, and a temperature controlling apparatus 100 that is monitored by the status monitoring apparatus 1.

The temperature controlling apparatus 100 includes a refrigeration circuit 101, a blower 110, a liquid temperature regulating apparatus 120, and a controller 130 for controlling them. The refrigeration circuit 101 and the blower 110 constitute an air conditioner. In the refrigeration circuit 101, a compressor 102, a condenser 103, an expansion valve 104 and an evaporator 105 are connected in this order by means of pipes in order to cause a refrigerant to flow. When fans of the blower 110 are driven in rotation by a motor, air cooled by the evaporator 105 is transferred. The blower 110 is electrically connected to an inverter 111, and the inverter 111 is electrically connected to the controller 130. The inverter 111 supplies a current at a predetermined frequency to the motor of the blower 110 in response to an instruction from the controller 130, so that the blower 110 is driven. At this time, in this embodiment, a supply current of the inverter 111 is inputted to a recording unit 131 of the controller 130.

The liquid temperature regulating apparatus 120 has a pump that is driven in rotation by a pump. When the pump is driven in rotation, a brine is circulated, for example. The liquid temperature regulating apparatus 120 is electrically connected to an inverter 121, and the inverter 121 is electrically connected to the controller 130. The inverter 121 supplies a current at a predetermined frequency to the motor of the liquid temperature regulating apparatus 120 in response to an instruction from the controller 130, so that the pump of the liquid temperature regulating apparatus 120 is driven. At this time, in this embodiment, a supply current of the inverter 121 is inputted to the recording unit 131 of the controller 130. In addition, the controller 130 includes the aforementioned recording unit 131, an output unit 132 for outputting information items recorded in the recording unit 131 to the outside, and various computing units that compute instructions to the inverters 111, 121, the compressor 102 and so on. The controller 130 is composed of, for example, a CPU, a ROM, a RAM, etc.

The status monitoring apparatus 1 is so-called a server and is composed of, for example, a CPU, a ROM, a RAM, etc. The status monitoring apparatus 1 is connected to the temperature controlling apparatus 100 through a relay apparatus 20 and a network 30. The relay apparatus 20 is an apparatus capable of communicating with the output unit 132 of the controller 130 by means of a near radio communication, for example. The relay apparatus 20 can receive, from the output unit 132, a value of a supply current to be supplied by the inverter 111 to the motor, and so on. The relay apparatus 20 may be a personal computer, a tablet computer, a smart phone, etc. The network 30 may be either an internet or a local area network.

In this embodiment, the status monitoring apparatus 1 obtains information items through the relay apparatus 20 from the controller 130 of the temperature controlling apparatus 100. However, the status monitoring apparatus 1 may obtain information items only through the network 30 from the controller 130.

Figure 2:
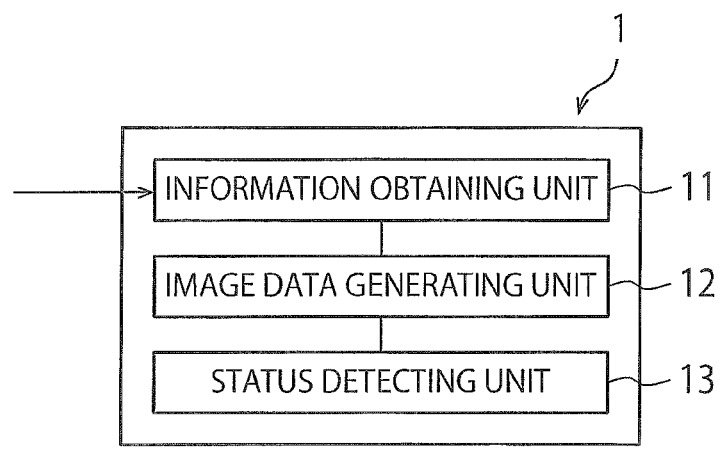
FIG. 2 is a functional block diagram of the status monitoring apparatus shown in FIG. 1.

FIG. 2 shows a functional block diagram of the status monitoring apparatus 1. As shown in FIG. 2, the status monitoring apparatus 1 includes an information obtaining unit 11 configured to obtain detected information items that are continuously detected (for example, values of a supply current supplied by the inverter 111 to the motor, and the like), an image data generating unit 12 configured to generate two-dimensional image data based on the detected information items obtained by the information obtaining unit 11, and a status detecting unit 13 configured to perform a machine learning and to make a judgment concerning failure based on the two-dimensional image data generated by the image data generating unit 12. In this example, respective processes of the information obtaining unit 11, the image data generating unit 12 and the status detecting unit 13 are carried out by the CPU that loads or expands, in the RAM, a program stored in the ROM.

The image data generating unit 12 partitions the detected information items, which are obtained by the information obtaining unit 11, by frames F at predetermined time intervals, and generates, for each frame F, two-dimensional image data representing a distribution of the detected information items in the frame F, with an axis of abscissa being a time axis and an axis of ordinate being an axis showing a value or an amount of the detected information items. Specifically, in this embodiment, image data showing a polygonal line graph sequentially connecting, by line segments, the detected information items adjacent to each other in the frame F, are generated as the two-dimensional image data.

The status detecting unit 13 performs a machine learning based on the two-dimensional image data, which are sequentially generated by the image data generating unit 12, so as to generate a correct label for judging whether the two-dimensional image data show a failure or a warning sign of failure, and judges that a failure or a warning sign of failure has occurred in the detected information items, when two-dimensional image data corresponding to a previously recorded or newly generated correct label are generated. In more detail, the status detecting unit 13 in this embodiment is configured to perform a machine learning utilizing an artificial intelligence algorism, to generate a correct label for judging whether two-dimensional image data show a failure or a warning sign of failure, and to judge whether a failure has occurred and/or a warning sign of failure has occurred in the temperature controlling apparatus 100, by comparing the two-dimensional image data and the correct label to each other. "Chainer" developed by the PFN company is employed in this embodiment as an artificial intelligence algorism (software), but another algorism may be employed.

Figure 3:
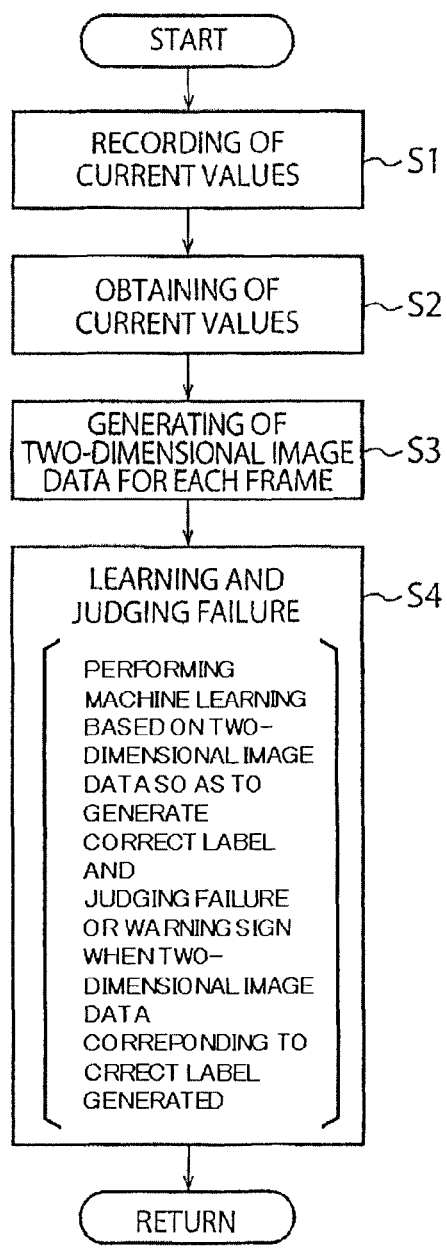
FIG. 3 is a flowchart for explaining a status monitoring operation of the status monitoring apparatus shown in FIG. 1.
Figures 4, 5:
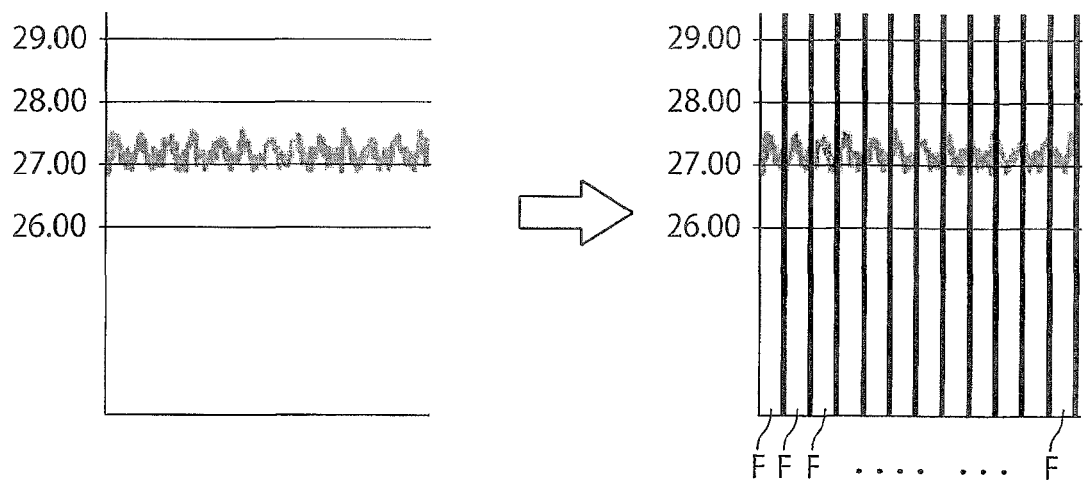
FIG. 4 is a concept diagram for explaining an image data generating step in the status monitoring operation shown in FIG. 3.
FIG. 5 is a concept diagram for explaining an image data generating step in the status monitoring operation shown in FIG. 3.
Figure 6:
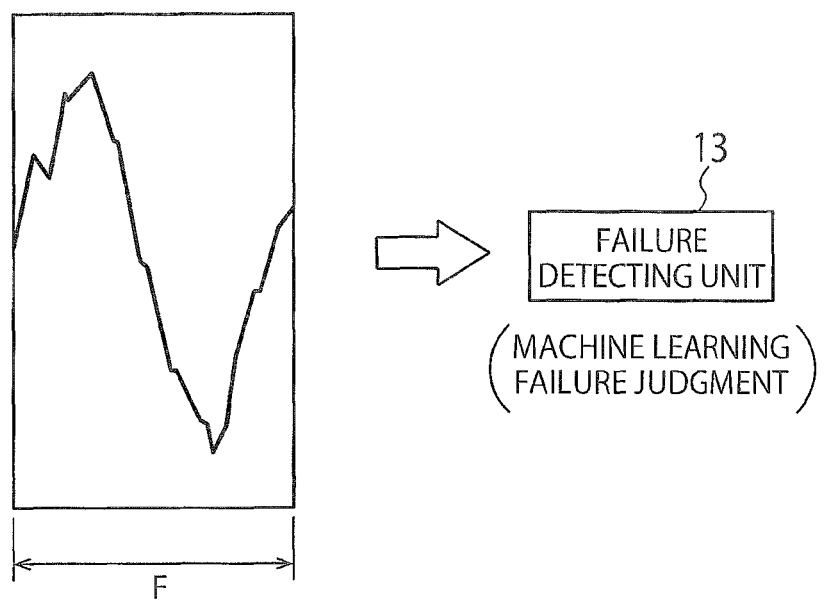
FIG. 6 is a concept diagram for explaining an image data generating step in the status monitoring operation shown in FIG. 3.

Next, FIG. 3 is a flowchart for explaining a status monitoring operation of the status monitoring apparatus 1, and FIGS. 4 to 6 are concept diagrams respectively for explaining an image data generating steps of the status monitoring operation. Herebelow, the status monitoring operation by the status monitoring apparatus 1 is described with reference to FIGS. 3 to 6. Herein, there is described an example in which a failure or a warning sign of failure of the blower 110 is detected, based on values of a supply current supplied by the inverter 111 to the blower 110.

In this embodiment, firstly in a step S1, the recording unit 131 of the controller 130 in the temperature controlling apparatus 100 records detected information items that are continuously detected. In particular, values of a supply current supplied by the inverter 111 to the blower 110 are recorded.

Then, in a step S2, the information obtaining unit 11 of the status monitoring apparatus 1 obtains the values of a supply current of the inverter 111, which are recorded in the recording unit 131, from the output unit 132 of the controller 130 through the relay apparatus 20 and the network 30.

Then, in a step S3, the image data generating unit 12 partitions the values of a supply current of the inverter 111, which have been obtained by the information obtaining unit 11, by frames F at predetermined time intervals, and generates, for each frame F, two-dimensional image data representing a distribution of the supply current values in the frame F, with an axis of abscissa being a time axis and an axis of ordinate being an axis showing a value or an amount of a supply current value.

FIG. 4 is a view conceptually showing the image data generating process performed by the image data generating unit in the step S3. When expressed as an image, an aggregation of supply current values obtained by the information obtaining unit 11 has a waveform, for example, which is shown in the left area in FIG. 4. As shown in the right area in FIG. 4, the image data generating unit 12 partitions such supply current values by frames F at predetermined time intervals, and generates, for each frame F, two-dimensional image data representing a distribution of the supply current values in the frame F.

Widths of the axis of abscissa of the frames F are determined such that, when the supply current values in the respective frames F are expressed as an image, the images in the respective frames have similarity in shape to each other. The widths of the frames F may be defined based on a previous observation of a waveform, or may be defined analytically. In this embodiment, the aggregations of the supply current values of the inverter 111 are connected along a polygonal curve, and a frequency analysis is carried out. A period of frequency components evaluated as peaks is employed as a width of the axis of abscissa of the frame F.

In this embodiment, the frequency analysis process is performed in an operation before the process of the image data generating unit 12 is performed. The frequency analysis is sometimes referred to as frequency assay or spectrum analysis. The frequency analysis is an analysis for identifying a distribution of frequency components contained in a waveform, and can be performed by a commercially available FFT (Fast Fourier Transformation) analyzer. When a width of the axis of abscissa of the frame F is determined with the use of the frequency analysis, a waveform connecting aggregations of supply current values along a polygonal curve are subjected to the frequency analysis, and frequency components evaluated as peaks are identified in the waveform. Then, by computing a period corresponding to the frequency components evaluated as peaks based on a relationship "frequency=1/period", the computed period is set as a width (time interval) of the axis of abscissa of the frame F.

In this embodiment, as shown in a values (26.85) surrounded by a dashed-line rectangular frame in an A column in FIG. 5, when an integer part of a minimum value of supply current values of the inverter 111, which is expressed as a numerical value, is larger than 1 or not less than 1, the image data generating unit 12 subtracts, from the respective supply current values of the inverter 111, a predetermined numerical value, in this case, "26", in such a manner that the integer part of the minimum value becomes 0. Then, the image data generating unit 12 uses the numerical values after the subtraction, so as to generate the two-dimensional image data. Thus, the number of bits, which are used when the supply current values of the inverter 111 are represented and when the supply current values are represented as image data, can be reduced. To be specific, as shown in FIG. 6, it is possible to generate two-dimensional image data as image data having a smaller size.

Then, in a step S4, as shown in FIG. 6, the status detecting unit 13 obtains the two-dimensional image data generated by the image data generating unit 12, and performs a machine learning based on the sequentially generated two-dimensional image data, so as to generate a correct label for judging whether two-dimensional image data show a failure or a warning sign of failure. When two-dimensional image data corresponding to the correct label are generated, the status detecting unit 13 judges that a failure or a warning sign of failure has occurred in the blower 110. The correct label generating process, which is performed by the status detecting unit 13 based on the machine learning, may either be an unsupervised machine learning in which a character extraction learning is performed by sequentially accumulating two-dimensional image data so as to obtain a correct label, or may be a supervised machine learning in which typical correct labels are previously recorded as supervisor data, and a machine learning is performed based on these correct labels to generate a new correct label.

Due to the aforementioned status monitoring apparatus 1 according to this embodiment, a failure or a warning sign of failure of continuously detected information items (in this embodiment, values of a supply current to the blower 110) can be efficiently and accurately judged, by using image data representing, for each frame, the continuously detected information items. In this embodiment, the information obtaining unit 11 obtains, as detected information items, current values of a current supplied to the blower 110 constituting the air conditioner. However, the information obtaining unit 11 may obtain, as detected information items, current values of a current supplied to the compressor 102 of the refrigeration circuit 101 constituting the air conditioner, pressure values of a refrigerant circulating in the refrigeration circuit 101, acceleration values of the expansion valve 104 of the refrigeration circuit 101, or current values of a current supplied to a pump for conveying a liquid. Acceleration values of the expansion valve 104 mean acceleration values of a valve body part of the expansion valve 104, i.e., acceleration values during vibrations.

MODIFICATION EXAMPLE 1

Next, a modification example 1 is described. The modification example 1 differs from the aforementioned embodiment in the process of the image data generating unit 12. The image data generating unit 12 according to the modification example 1 firstly partitions detected information items (current values) by two frames F continuously adjacent to each other, sequentially shifts a first frame F of the two frames F at detection intervals of detected information items, until the first frame F is positioned to overlap with a next frame F, extracts maximum values and minimum values of the detected information items at a position before the frame is shifted and at respective positions after the frame is shifted. Then, the image data generating unit 12 chronologically arranges, in the first frame, the extracted maximum values and the minimum values in an ascending order of the detection timings. Then, the image data generating unit 12 generates image data showing areas like strips such that an area between a boundary line connecting the maximum values along a polygonal curve and a boundary line connecting the minimum values along a polygonal curve differs from other areas, and generates the image data as two-dimensional image data corresponding to the first frame F.

Figure 7:
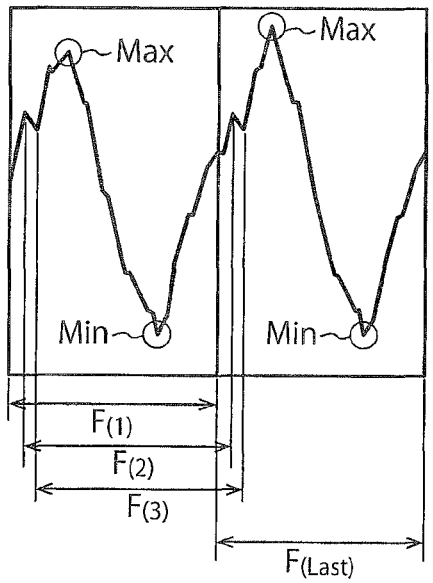
FIG. 7 a concept diagram for explaining an image data generating step in the status monitoring operation according to a modification example.
Figure 7:
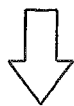
Figure 7:
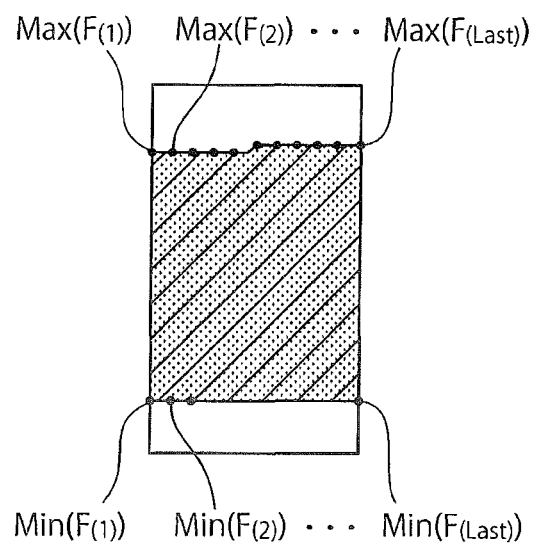

FIG. 7 is a view for conceptually explaining an image data generating step according to the modification example 1. To "shift a first frame F of the two frames F at detection intervals of detected information items, until the first frame F is positioned to overlap with a next frame F" means that ranges of the frames F partitioning detected information items are sequentially (successively) shifted rearward, as shown by F(1), F(2), F(3) F(Last) in FIG. 7. The first frame F corresponds to F(1), and the aforementioned next frame F corresponds to F(Last). In this modification example, the shift process is performed until the frame F(1) is positioned to overlap with the frame F(Last). At respective positions of F(1), F(2), F(3) . . . F(Last), maximum values (Max) and minimum values (Min) of the detected information items are extracted. Then, as shown in the lower area of FIG. 7, the extracted maximum values and the minimum values are chronologically arranged in the first frame F(1) in an ascending order of the detection timings. At this time, original detected information items are cleared (deleted). A boundary line is formed by connecting the maximum values along a polygonal curve, and a boundary line is formed by connecting the minimum values along a polygonal curve. Image data showing areas like strips such that an area between the two boundary lines differs from other areas are generated as two-dimensional image data corresponding to the first frame F of the two continuously adjacent frames originally partitioning the detected information items.

Since the thus generated two-dimensional image data have less noise components, the modification example 1 can reduce a computation time of the status detecting unit 13.

MODIFICATION EXAMPLE 2

Next, a modification example 2 is described. The modification example 2 differs from the aforementioned embodiment in the process of the image data generating unit 12.

Figure 8:
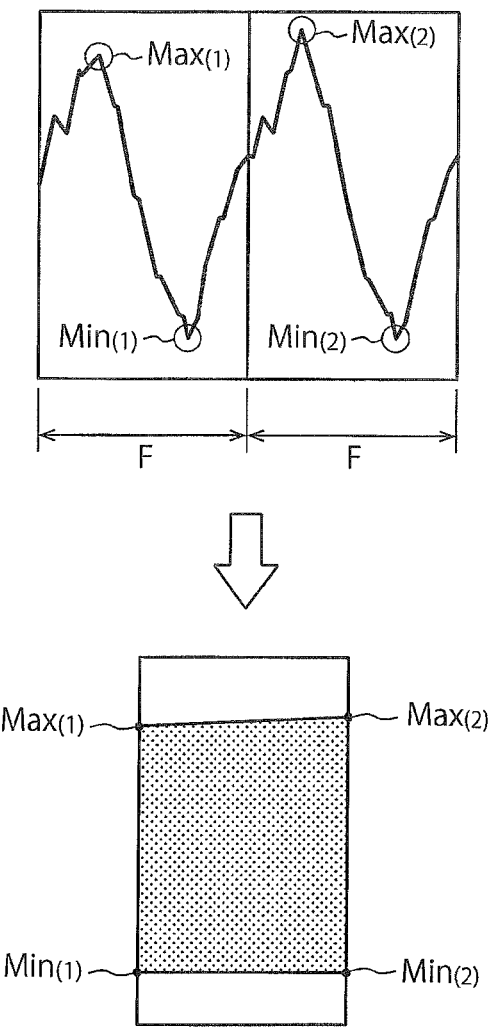
FIG. 8 a concept diagram for explaining an image data generating step in the status monitoring operation according to another modification example.

FIG. 8 is a view for conceptually explaining an image data generating step according to the modification example 2. In view of FIG. 8, the image data generating unit 12 according to the modification example 2 partitions detected information items (current values) by two frames F, F continuously adjacent to each other, and extracts, in the respective frames F, F, maximum values Max(1), Max(2) and minimum values Min(1), Min(2) of the detected information items. Then, the image data generating unit 12 sets the maximum value Max(1) and the minimum value Min(1) of the detected information items of the first frame F of the adjacent frames F, F, at a front end of the axis of abscissa of the first frame F. In addition, the image data generating unit 12 sets the maximum value Max(2) and the minimum value Min(2) of the detected information items of a next frame, at a rear end of the axis of abscissa of the first frame F. Then, the image data generating unit 12 generates image data showing areas like strips such that an area between a boundary line connecting the maximum values by a line segment and a boundary line connecting the minimum values by a line segment differs from other areas, as two-dimensional image data corresponding to the first frame F.

Since the thus generated two-dimensional image data also have less noise components, the modification example 2 can reduce a computation time of the status detecting unit 13.

Although the embodiment of the present invention has been described above, the present invention is not limited to the aforementioned embodiment and the modification examples. The aforementioned embodiment and the modification examples may be further modified. Although the present invention is used in an air conditioner or a chiller in the aforementioned embodiment, the present invention can be applied to various other fields.

What is claimed is:

1. A status monitoring apparatus comprising:
    an information obtaining module that obtains detected information items that are continuously detected;
    an image data generating module that partitions the detected information items, which are obtained by the information obtaining module, by frames at predetermined time intervals, and configured to generate, for each frame, two-dimensional image data representing a distribution of the detected information items in the frame, with an axis of abscissa being a time axis and an axis of ordinate being an axis showing a value or an amount of the detected information items; and
    a status detecting module that performs a machine learning based on the two-dimensional image data which are sequentially generated by the image data generating module, so as to generate a correct label for judging whether the two-dimensional image data show a failure or a warning sign of failure, and configured to judge that a failure or a warning sign of failure has occurred in the detected information items, when the two-dimensional image data corresponding to the correct label are generated.

2. The status monitoring apparatus according to claim 1, wherein the image data generating module generates, as the two-dimensional image data, image data representing a polygonal line graph sequentially connecting, by line segments, the detected information items adjacent to each other in the frame.

3. The status monitoring apparatus according to claim 1, wherein the image data generating module partitions the detected information items by two frames continuously adjacent to each other, sequentially shifts a first frame of the two frames at detection intervals of the detected information items until the first frame is positioned to overlap with a next frame, extracts maximum values and minimum values of the detected information items at respective positions before the frame is shifted and respective positions after the frame is shifted, chronologically arranges the extracted maximum values and the minimum values in an ascending order of the detection timings, so as to generate image data showing areas like strips such that an area between a boundary line connecting the maximum values along a polygonal curve and a boundary line connecting the minimum values along a polygonal curve differs from other areas, and provides the image data as the two-dimensional image data corresponding to the first frame.

4. The status monitoring apparatus according to claim 1, wherein
    the image data generating module partitions the detected information items by two frames continuously adjacent to each other, extracts, in the respective frames, maximum values and minimum values of the detected information items, sets the maximum value and the minimum value of the detected information items in a first frame of the two frames, at a front end of the axis of abscissa of the first frame, sets the maximum value and the minimum value of the detected information items in a next frame, at a rear end of the axis of abscissa of the first frame, generates image data showing areas like strips such that an area between a boundary line connecting the maximum values by a line segment and a boundary line connecting the minimum values by a line segment differs from other areas, and provides the image data as the two-dimensional image data corresponding to the first frame.

5. The status monitoring apparatus according to claim 1, wherein
    the detected information items are current values of a current supplied to a compressor of a refrigeration circuit constituting an air conditioner, pressure values of a refrigerant circulating in the refrigeration circuit, acceleration values of an expansion valve of the refrigeration circuit, current values of a current supplied to a blower constituting the air conditioner, or current values of a current supplied to a pump for conveying a liquid.

6. A status monitoring method comprising:
    an information obtaining step which obtains detected information items that are continuously detected;
    an image data generating step which partitions the detected information items, which are obtained in the information obtaining step, by frames at predetermined time intervals, and generates, for each frame, two-dimensional image data representing a distribution of the detected information items in the frame, with an axis of abscissa being a time axis and an axis of ordinate being an axis showing a value or an amount of the detected information items; and
    a status detecting step which performs a machine learning based on the two-dimensional image data which are sequentially generated in the image data generating step, so as to generate a correct label for judging whether the two-dimensional image data show a failure or a warning sign of failure, and judges that a failure or a warning sign of failure has occurred in the detected information items, when the two-dimensional image data corresponding to the correct label are generated.

7. A program executable in a computer to perform:
    an information obtaining step which obtains detected information items that are continuously detected;

an image data generating step which partitions the detected information items, which are obtained in the information obtaining step, by frames at predetermined time intervals, and generates, for each frame, two-dimensional image data representing a distribution of the detected information items in the frame, with an axis of abscissa being a time axis and an axis of ordinate being an axis showing a value or an amount of the detected information items; and a status detecting step which performs a machine learning based on the two-dimensional image data which are sequentially generated in the image data generating step, so as to generate a correct label for judging whether the two-dimensional image data show a failure or a warning sign of failure, and judges that a failure or a warning sign of failure has occurred in the detected information items, when the two-dimensional image data corresponding to the correct label are generated.

* * * * *